United States Patent [19]

Frankel et al.

[11] Patent Number: 4,962,213

[45] Date of Patent: Oct. 9, 1990

[54] ENERGETIC AZIDO CURING AGENTS

[75] Inventors: Milton B. Frankel, Tarzana; Edgar R. Wilson, Simi Valley; Dean O. Woolery, II, Reseda, all of Calif.

[73] Assignee: Rockwell International Corporation, El Segundo, Calif.

[21] Appl. No.: 314,694

[22] Filed: Feb. 6, 1989

Related U.S. Application Data

[63] Continuation-in-part of Ser. No. 64,735, Jun. 22, 1987, abandoned.

[51] Int. Cl.$^5$ ............................................. C07C 247/04
[52] U.S. Cl. .......................................... 552/12; 552/11
[58] Field of Search ..................................... 552/11, 12

[56] References Cited

U.S. PATENT DOCUMENTS

| | | | |
|---|---|---|---|
| 2,978,474 | 4/1961 | Klager et al. | 260/349 X |
| 2,978,475 | 4/1961 | Klager | 260/349 X |
| 2,978,476 | 4/1961 | Klager et al. | 260/349 X |
| 3,373,181 | 3/1968 | Linden et al. | 260/349 X |
| 4,268,450 | 5/1981 | Frankel et al. | 260/349 UX |
| 4,337,205 | 6/1982 | Buder et al. | 260/349 |
| 4,486,351 | 12/1984 | Earl | 260/349 |

OTHER PUBLICATIONS

Noller, "Chemistry of Organic Compounds", 3rd Ed. (1965), p. 339; W. B. Saunders Co., Phila. & London.

Primary Examiner—Joseph Paul Brust
Attorney, Agent, or Firm—H. Fredrick Hamann; Harry B. Field; David C. Faulkner

[57] ABSTRACT

Energetic azido curing agents are provided for curing hydroxy-terminated aliphatic polymers having pendant alkyl azide groups.

2 Claims, No Drawings

ENERGETIC AZIDO CURING AGENTS

This is a continuation-in-part of co-pending application Ser. No. 07/064,735 filed on June 22, 1987, now abandoned.

BACKGROUND OF THE INVENTION

1. Field of the Invention

This invention relates to the curing of polymeric compositions. This invention further relates to the curing of hydroxy-terminated aliphatic prepolymers having pendant alkyl azide groups with isocyanate-terminated aliphatic prepolymers having pendant alkyl azide groups.

2. Description of Related Art

In the manufacture of solid rocket propellants, a polymeric substance is frequently employed as a binder to hold together fuel and oxidizer compounds of the propellant. The binder may, of course, supply fuel or oxidizer elements itself. Certain of the polymeric binders are prepared from hydroxy-terminated prepolymers. The addition of curing agents to these prepolymers causes cross-linking between the functional groups of the prepolymer, resulting in a polymer. The polymers physical properties vary with the degree of cross-linkage. This degree can be varied by the amount and type of curing agent added. In general, it is desired to cure the prepolymers to a degree such that the resulting polymer has the physical properties of an elastomer. Examples of prior art curing agents are toluene diisocyanate, isophorone diisocyanate, 3-nitraza-1,5-pentane diisocyanate and N100, a polyfunctional isocyanate produced commercially by Mobay Chemical Company.

It is usually desired to suspend other compounds in the polymer binder composition. For instance, a solid rocket propellant composition could comprise such a polymer having particulate fuel and oxidizer suspended in it. Examples of suitable fuel would be light metals and light metal hydrides. Examples of suitable oxidizers would be perchlorates and nitrates.

SUMMARY OF THE INVENTION

According, there is provided by the present invention energetic azido curing agents, including isocyanate-terminated glycidyl azide polymers, and a method for producing same.

OBJECTS OF THE INVENTION

It is therefore an object of this invention to provide a method for curing hydroxy terminated prepolymers with isocyanate-terminated glycidyl azide polymers.

It is a further object of this invention to provide a curing method for compositions containing hydroxy-terminated aliphatic polymers having pendant alkyl azide groups.

It is an additional object of this invention to provide novel prepolymer and polymer compositions and procedures for preparing same.

Other objects and many attendant advantages will be evident from the following description.

DESCRIPTION OF THE PREFERRED EMBODIMENTS

The objects of this invention are accomplished by utilizing as energetic azido curing agents compounds terminated with an isocyanate group as the curing agent for hydroxy-terminated aliphatic polymers.

Examples of hydroxy-terminated aliphatic polymers suitably cured according to the teachings of this invention are glycidyl azide polymers such as described in U.S. Pat. No. 4,268,450, incorporated herein by reference.

In preparing formulations according to the present invention, the curing compound of the invention is suitably mechanically mixed with the prepolymer to be cured. Curing temperatures range between about 25° C. to about 60° C. Curing typically takes between from about 2 to about 144 hours.

It is well known that the degree of cross-linkage, or polymerization, in a polymer may be effected by the amount of curing agent used to cure the polymer. In general, when more curing agent is used, more cross-linkage is found, and the polymer is harder and less elastic. For solid rocket propellant compositions, it is generally desirable that the composition be capable of at least 10% elongation at maximum stress, and about 40% would be more desirable in curing hydroxy-terminated aliphatic polymers having pendant alkyl azide groups with the curing agents of the instant invention, a polymer of suitable elasticity is achieved with a isocyanate to hydroxyl equivalent ratio of about 0.6 to 1.5.

By way of example and not limitation, the energetic azido curing agents of the present invention can be prepared as set forth in the following example.

EXAMPLE 1

An isocyanate-terminated glycidyl azide polymer, also known as glycidyl azide polymer diisocyanate of the general formula (1)

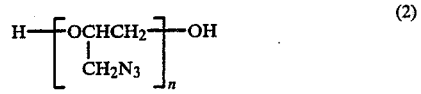

(2)

was prepared by reacting a compound of the general formula (2)

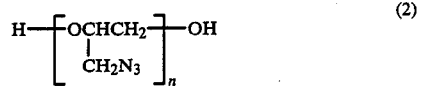

(2)

wherein n is an integer from about 2 to about 20, with an excess of hexamethylene diisocyanate.

In a suitable vessel equipped with a stirrer, a solution of 100 grams (0.27 equivalents) of low molecular weight glycidyl azide polymer (equivalent weight equal to 370) in reagent grade methylene chloride was added to 336 grams (1.08 equivalents) of hexamethylene diisocyanate (HMDI) under a nitrogen atmosphere. The solution was stirred for 5 days at ambient temperature, concentrated, and passed through a wiped film distillation apparatus at 65° C. and 20μ pressure to remove the excess HMDI. There remained 117.5 grams (80%) of the diisocyanate compound. The isocyanate equivalent weight was determined by reaction with excess dibutylamine, followed by back titration with standardized HCl and found to be 1042.

EXAMPLE 2

A isocyanate-terminated glycidyl azide polymer of the general formula (3)

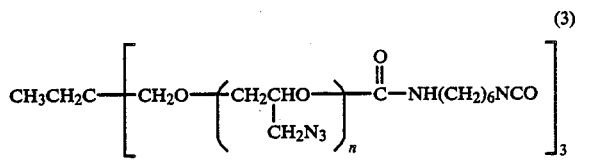

(3)

was prepared by initiating the polymerization of epichlorohydrin with trimethylolpropane to produce polyepichlorohydrin triol of general formula (4)

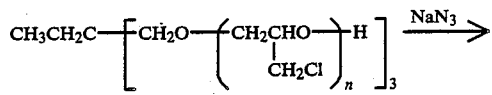

(4)

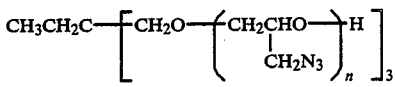

(5)

followed by reacting the compound of formula (4) with sodium azide in an appropriate polar solvent such as dimethylsulfoxide, dimethylformanide or polyethylene glycol to give the compound of formula (5), and where n is an integer from about 2 to about 20. The conversion to the azide polymer may also be accomplished in an aqueous phase using sodium azide and a fatty quaternary ammonium salt as a phase transfer catalyst.

The synthesis of Example 2 was based on initiating the polymerization of about 2775grams of epichlorohydrin with about 134 grams of trimethylolpropane to form the polyepichlorohydrin triol (pech-triol) (4), which was then converted to the compound of formula (5) above by reacting the polyepichlorohydrin triol with sodium azide in a polar organic solvent for about 12 hours and then purifying to produce the final product. The purified prepolymer (100 g) was reacted with 43g of hexamethylene diisocyanate for 2–48 hours at 25 to 50° C. The excess isocyanate was removed by distillation at reduced pressure (60c/2μ) to yield the compound of formula (3).

EXAMPLE 3

A prepolymer composition was cured by mixing a isocyanate-terminated glycidyl azide polymer and from about 10% to about 90% by weight of hydroxy-terminated aliphatic polymer having pendant alkyl azide groups at a temperature of between 25° C. and 50° C. for about 1 hour. The mixing was followed by curing the reactants within a temperature range of 25° C. to 60° C. for from about 2 to 144 hours.

The mixing temperature may range from between ambient to about 50° C. Likewise, the curing of the reacting prepolymers may take place within a temperature range of from about 25° C. to about 60° C. depending upon the prepolymer composition which in turn may require as a curing time from about 2 to about 144 hours.

Obviously, numerous variations and modifications may be made without departing from the present invention. Accordingly, it should be clearly understood that the form of the present invention described above is illustrative only and is not intended to limit the scope of the present invention.

What is claimed and desired to be secured by Letters Patent of the United States is:

1. As a composition of matter the isocyanate-terminated aliphatic polymer having a structural formula of

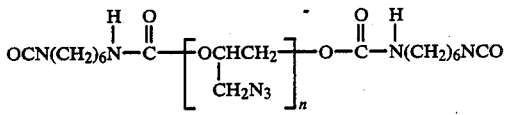

wherein n is an integer from 1 to about 20.

2. As a composition of matter the isocyanate-terminated aliphatic polymer having a structural formula of:

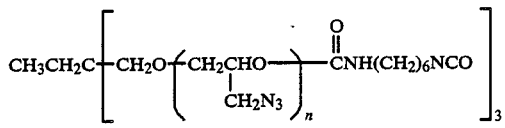

wherein n is an integer from 2 to about 20.

* * * * *